Aug. 5, 1924.
R. H. JACKSON
SHOCK ABSORBER
Filed Oct. 31, 1923
1,504,122
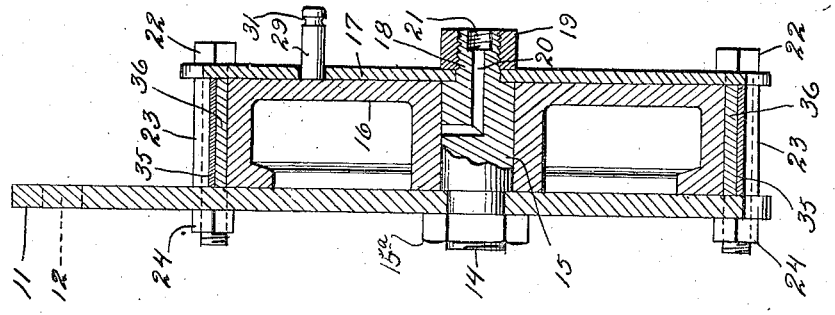
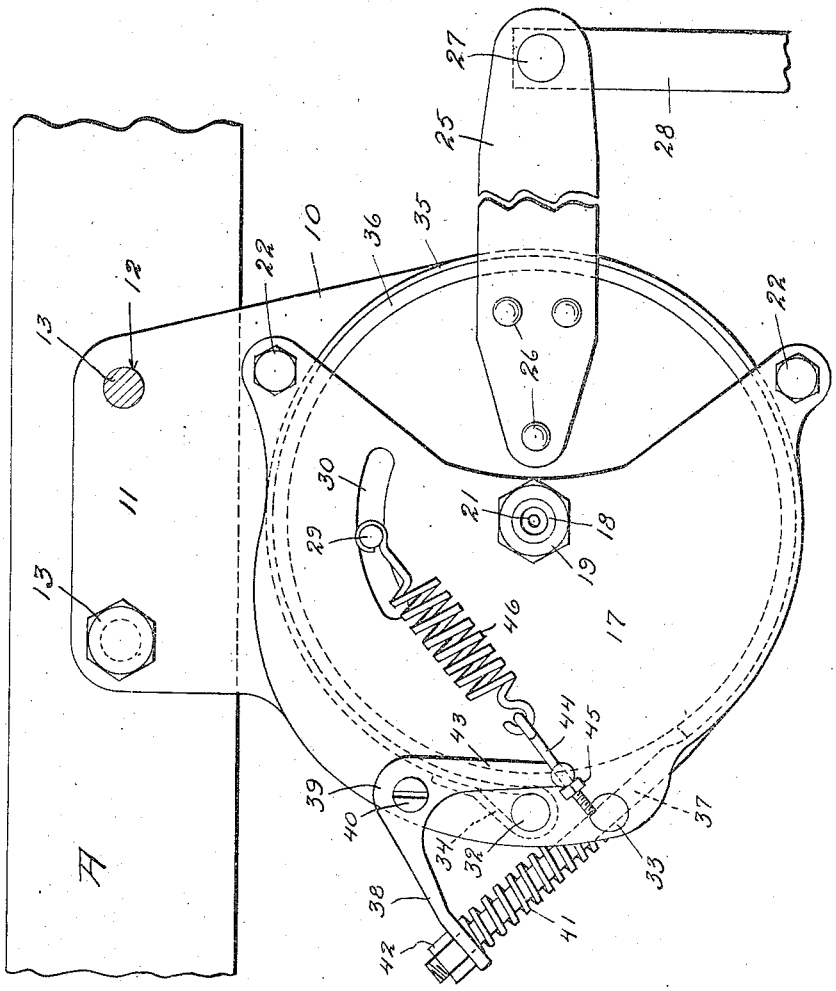
Inventor
Roy H. Jackson
Witness
John Milton Jester
By
Attorney Patented Aug. 5, 1924.

1,504,122

UNITED STATES PATENT OFFICE.

ROY H. JACKSON, OF OAKLAND CITY, INDIANA.

SHOCK ABSORBER.

Application filed October 31, 1923. Serial No. 671,958.

*To all whom it may concern:*

Be it known that I, ROY H. JACKSON, a citizen of the United States, residing at Oakland City, county of Gibson, State of Indiana, have invented certain new and useful Improvements in Shock Absorbers, of which the following is a specification.

This invention relates to a novel arrangement of parts and members to control the relative action of a vehicle body in respect to the axles of same and more essentially to control the action of the springs supporting said body on the axles, both in their expansive and compressive actions.

An important object of this invention is the arrangement of said parts and members in such a manner that a restraining force is applied to the above mentioned spring, which tends to control or regulate its compression and expansion action.

Another feature of this invention is that the said restraining force, offered to the expansion and compression of said springs, may be of adjustable value or strength; also that the value or strength of said restraining force offered to the compression of said springs may be adjustable or varied as compared with the value or strength of the restraining force applied, while the springs are compressed, shall be equal to or a fractional part of the force applied when the springs expand.

A vital object is to provide friction and motion control means which will, on account of the peculiar arrangement of certain parts, vary the strength of the restraining action in such a manner that the greatest force applied is at the time when the springs are completely compressed, the force reaching its minimum when the springs are entirely expanded.

Broadly speaking, the device consists of a movable drum or equivalent element encircled by a friction band upon which is a variable spring tension controlled by movement of a vehicle body toward and from the axles of the car.

With the above and other objects and advantages in view, the invention consists in the combination and arrangement of the parts to be hereinafter more fully described and claimed and illustrated in the accompanying drawings in which:

Figure 1 is an elevation of the device.

Figure 2 is a central vertical cross section.

Referring more particularly to the drawing, the numeral 10 designates a supporting plate or bracket which has its upper end 11 prolonged upwardly to define an attaching member which is formed with holes 12 for the passage of bolts 13 or the like, which secure the device to the frame A of the vehicle. This plate is provided with a suitable hole through which extends the reduced end 14 of a bolt 15 held in place by a nut 15ª screwed onto its reduced end. This bolt serves as the pivot for a drum 16 in front of which is located a plate 17 which forms a cover, which plate has a hole engaged upon the reduced outer end 18 of the bolt. A suitable nut 19 is screwed upon this end and holds the plate against displacement. For effecting lubrication of the drum, the bolt is formed with an L-shaped passage 20 which leads from a threaded recess 21 into which may be screwed a grease cup or the like, not shown. The plate 17 is also held by bolts 22 which pass therethrough, through spacing sleeves 23 and through the plate 10, securing being effected by suitable nuts 24 which bear against the rear side of the plate 10.

Carried by the drum is an outwardly extending arm 25 which is secured thereto by bolts or rivets 26 and to the free end of which is pivoted, at 27, a rod or link 28 which is adapted to be secured in some preferred manner to the axle of the vehicle so that when the frame moves up or down with respect to the axle, the drum will be rotated.

Secured to and projecting outwardly from the drum is a pin 29 movable along an arcuate slot 30 in the plate 17 and having its outer end formed with a peripheral groove 31 for a purpose to be described.

Extending transversely between the plates 10 and 17 are posts or pins 32 and 33, the former of which serves to hold the looped end 34 of a friction band 35 which encircles the drum and which is equipped with a lining 36 of the material commonly used for lining brakes. The other end of the band is thickened and narrowed down, as shown at 37, to define a bolt-like extension which is slidable through the pin or post 33 and which passes through one arm 38 of an angle lever 39 pivoted at 40 upon the plate 17. A coil spring 41 encircles this bolt-like extension and bears against the post 33 and the arm 38 for normally urging the latter outwardly. The angle lever 39 includes a second arm 43 through the free end of which passes an adjustable eye bolt 44 held in any desired position by a nut 45 thereon. The tension means comprises a spring 46 which has one end engaged within the eye bolt 44 and its other end engaged within the groove 31 in the pin 29.

In the operation, it will be seen that when the frame A of the car moves downwardly toward the axles, the effect is to rotate the drum in a counter-clockwise direction which results in reduction of the distance from the pin 29 to the eye bolt 44. This reduces the tension of the spring 46 and permits the spring 41 to exert a greater outward pressure on the angle lever arm 38 which in turn results in increasing the friction of the band on the drum so that there will be a greater restraining effect than in the first place. When the rebound occurs and the frame moves upwardly with respect to the axles, the drum rotates in a clockwise direction and the pin 29 moves further from the eye bolt 44 which stretches the spring 46 and applies tension to the angle lever 39. This movement of the angle lever tends to compress the spring 41 so that the spring 41 will exert a decreased pressure tending to hold the band about the drum. The brake band is then pulling against the stationary pin 32 and exerts its greatest restraining force which tends to hold the vehicle spring in its compressed position but, due to the reaction of said spring, the arm 25 is moved in a clockwise direction and the pin 29 moving in the same direction causes an increase of the tension in the spring 46, thereby reducing the action of the spring 41 on the brake band and allowing a variable restraining force which acts at its greatest when the arm 25 is in a slightly upwardly inclined position and which has its least effect when the arm reaches a correspondingly downwardly inclined position.

From the foregoing description and a study of the drawings it will be apparent that I have thus provided means whereby a positive yet variable restraining force is brought to bear against the relative movements of any vehicle axle with respect to the body thereof so that in one direction said force may be equal to a fractional part of the force in the other direction.

While I have shown and described one means for carrying out the invention, it must be emphasized that the invention does not deal with the style or shape of the elements involved nor the relative arrangements of the same as the right is reserved to employ any means for applying friction to a movable part for the purpose of obtaining the restraining forces and variation thereof above described in the application of the principle to a vehicle having a frame mounted for movement with respect to its axis, provided, however, that the changes constitute no departure from the spirit of the subjoined claims.

I claim:

1. A shock absorber for vehicles comprising a support stationarily mounted upon one portion of a vehicle, a drum rotatably mounted upon the support and connected with an element of the vehicle capable of movement with respect to the first named portion, a friction band encircling the drum and having one end anchored to the support, means for applying spring tension to the other end of the band tending to constrict the band about the drum, and means connected with the drum for varying said tension in accordance with the movement of the drum.

2. A shock absorber for vehicles comprising a support stationarily mounted upon one portion of a vehicle, a drum rotatably mounted upon the support and connected with an element of the vehicle capable of movement with respect to the first named portion, a friction band encircling the drum and having one end anchored to the support, means for applying spring tension to the other end of the band tending to contract the band about the drum, and means connected with the drum for varying said tension in accordance with the movement of the drum, whereby to increase the tension when the drum is rotated in one direction and to decrease the tension when the drum is rotated in the other direction.

3. In a shock absorber for vehicles, a support stationarily mounted upon an element of a vehicle, a drum rotatably mounted on said support, means carried by the drum and connected with another element of the vehicle movable with respect to the first named element, a friction band encircling the drum and having one end anchored upon the support, an angular lever pivoted upon the support, a spring engaged by one arm of said angle lever and operating to contract the band, and a connection between the drum and the other arm of the lever for varying the tension of said spring in accordance with the position of the drum.

4. In a shock absorber for vehicles, a support stationarily mounted upon one element of a vehicle, a drum rotatably mounted upon the support, means carried by the drum and connected with another element of the vehicle movable with respect to the first named element, a friction band encircling the drum and having one end anchored, spring means connected with the band at the other end thereof for exerting a contracting effect, a lever pivoted upon the support and having one end engaging said spring means, and a yieldable connection between the drum and the other end of the lever for increasing or decreasing the tension of said spring means according to the direction of rotation of the drum.

5. In a shock absorber for vehicles, a support stationarily mounted upon one element of a vehicle, a drum rotatably mounted upon the support, means carried by the drum connected with another element of the vehicle movable with respect to the first named element, a friction band encircling the drum and having one end anchored, spring means connected with the band at the other end thereof for exerting a contracting effect, a lever pivoted upon the support and having one end engaging said spring means, and a yieldable connection between the drum and the other end of the lever for increasing or decreasing the tension of said spring means according to the direction of rotation of the drum, said last named means including a spring connected at one end with the drum and adjustably connected at its other end with the lever, the adjustability permitting variation in the relation between the two springs.

6. In a shock absorber for vehicles, a rotatably mounted drum, means for connecting the drum with two relatively movable elements of a vehicle whereby the drum will be rotated upon movement of said elements toward or from each other, a friction band encircling the drum, spring means connected with the band tending normally to contract the same about the drum, and means connected with the drum and said first named means for automatically varying the spring tension and consequently the braking action of the band upon the drum in accordance with the direction of rotation of the drum.

7. A shock absorber for vehicles comprising a support stationarily mounted upon one portion of a vehicle, a drum rotatably mounted upon the support and connected with an element of the vehicle capable of movement with respect to the first named element, a friction band encircling the drum, constant spring tension on said band, and means connected with and operated by movement of the drum whereby to vary said spring tension.

8. A shock absorber for vehicles comprising a drum rotatably supported from the vehicle frame and having an arm connected with an axle of the vehicle, a friction band encircling the drum and having one end anchored, a spring exerting constant tension upon the other end of the band for holding the same contracted, a pivoted lever engaging the outer end of said spring, and a spring connected with said lever and with the drum and acting to control the tension on the first named spring as the drum is turned.

9. In a shock absorber for vehicles, a stationary support mounted upon an element of a vehicle, a drum rotatably mounted upon the support, and means mounted on the drum and connected with another element of the vehicle movable with respect to the first named element, a friction band encircling the drum and having one end anchored, an abutment member on the support, an extension at the other end of the band slidable through the abutment member, an angle lever pivoted upon the support, said extension passing through the end of one arm of said lever, a spring surrounding said extension and engaging said lever arm and said abutment member, an element projecting from one side of the drum, the support having a slot for the accommodation of said last named element, and a spring connected with said last named element and with the other arm of said angle lever for moving the same and varying the tension of the first named spring in accordance with rotary movement of the drum.

10. In a shock absorber for vehicles, a rotatably mounted drum connected with elements of a vehicle whereby to be rotated upon movement of said elements toward or from each other, friction means opposing rotation of the drum, spring means controlling the tension on the friction means, and means connected with the drum and said spring means for varying the tension of the latter upon the friction means automatically in accordance with the direction of rotation of the drum.

In testimony whereof I hereto affix my signature.

ROY H. JACKSON.